US009002772B2

(12) United States Patent
Cohen et al.

(10) Patent No.: US 9,002,772 B2
(45) Date of Patent: Apr. 7, 2015

(54) SCALABLE RULE-BASED PROCESSING SYSTEM WITH TRIGGER RULES AND RULE EVALUATOR

(75) Inventors: Daniel Cohen, Nataf (IL); Yigal S. Dayan, Jerusalem (IL); Josemina M. Magdalen, Jerusalem (IL); Yariv Tzaban, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 13/299,640

(22) Filed: Nov. 18, 2011

(65) Prior Publication Data

US 2013/0132325 A1 May 23, 2013

(51) Int. Cl.
G06F 17/21 (2006.01)
G06F 17/27 (2006.01)
G06F 17/40 (2006.01)
G06N 5/02 (2006.01)

(52) U.S. Cl.
CPC ............ *G06N 5/025* (2013.01); *G06F 17/2705* (2013.01)

(58) Field of Classification Search
USPC .......................................................... 706/48
See application file for complete search history.

(56) References Cited

U.S. PATENT DOCUMENTS

| | | | |
|---|---|---|---|
| 7,191,119 B2 | 3/2007 | Epstein et al. | |
| 7,286,978 B2 | 10/2007 | Huang et al. | |
| 7,636,703 B2 | 12/2009 | Taylor | |
| 7,702,629 B2 | 4/2010 | Cytron et al. | |
| 7,912,808 B2 | 3/2011 | Pandya | |
| 2004/0122654 A1 | 6/2004 | Moore | |
| 2007/0219773 A1 | 9/2007 | Roux et al. | |
| 2009/0248652 A1 | 10/2009 | Iwayama et al. | |
| 2011/0257962 A1 | 10/2011 | Gopi | |

FOREIGN PATENT DOCUMENTS

| | | |
|---|---|---|
| CN | 101158948 A | 4/2008 |
| EP | 0575192 A2 | 12/1993 |

OTHER PUBLICATIONS

Paschke, ECA-RuleML: An Approach combining ECA Rules with temporal interval-based KR Event/Action Logics and Transactional Update Logics [online], Nov. 2005 [retrieved on Oct. 10, 2013]. Retrieved from the Internet:<URL:hhttp://arxiv.org/ftp/cs/papers/0610/0610167.pdf>.*
English Abstract and Translation for CN101158948A, published Apr. 9, 2008, Total 9 pp.
Preliminary Amendment, Jul. 5, 2012, for U.S. Appl. No. 13/542,460, filed Jul. 5, 2012 by D. Cohen et al., Total 6 pp.
(Continued)

*Primary Examiner* — Jeffrey A Gaffin
*Assistant Examiner* — Nathan Brown, Jr.
(74) *Attorney, Agent, or Firm* — Janaki K. Davda; Konrad, Raynes, Davda & Victor LLP (57) ABSTRACT

A system, method and computer program product for scalable, rule-based processing, including an automaton builder for constructing automatons corresponding to trigger rules and word lists that are employed by the trigger rules, and a rule evaluator for evaluating any of the trigger rules with respect to an input document by selecting any of the automatons to evaluate a given one of the trigger rules, parsing the input document using the selected automatons, determining whether conditions of the given trigger rule are met, and identifying any actions that are associated with the given trigger rule.

18 Claims, 5 Drawing Sheets

(56) References Cited

OTHER PUBLICATIONS

U.S. Appl. No. 13/542,460, filed Jul. 5, 2012 entitled "Scalable, Rule-Based Processing", invented by Cohen, D., Y.S. Dayan, J.M. Magdalen, and Y. Tzaban, Total 26 pp.
"A CoRSA Template", [online], [Retrieved on Nov. 16, 2011]. Retrieved from the Internet at <URL: http://johnward.net/cv/DissertationWeb/Dissertation.htm, Total 74 pp.
Chomsky, N., "Noam Chomsky's Generative Grammars", [online], [Retrieved Nov. 16, 2011]. Retrieved from the Internet at <URL: http://www.objectivegui.com/en/WebMS_key_concepts/Chomsky_generative_grammars.html>, Objective GUI, 2007, Total 1 p.
Frej, D. and T. Parr, "ANTLR v3 Documentation", [online], [Retrieved on Dec. 28, 2011]. Retrieved from the Internet at <URL: http://www.antlr.org/wiki/display/ANTLR3/ANTLR+v3+documentation>, Total 3 pp.
Havsiyevych, I., "Formal Grammars and Tools for Java", [online], [Retrieved on Nov. 16, 2011]. Retrieved from the Internet at <URL: http://illya-keeplearning.blogspot.com/2009/03/formal-grammar.html>, Keep Learning Personal Personal Blog of Illya Havsiyevych, Mar. 29, 2009, Total 8 pp.
ObjectiveGUI, "Site Grammar ®: a Smart Web Construction Kit", [online], [Retrieved on Nov. 16, 2011]. Retrieved from the Internet at <URL: http://www.objectivegui.com/en/WebMS_key_concepts/Site_grammar.html>, ObjectiveGUI, 2007, Total 1 p.
U.S. Appl. No. 13/299,692, filed Nov. 18, 2011, entitled "Computer-Based Construction of Arbitrarily Complex Formal Grammar Expressions", invented by Dayan, Y.S., G. Fuchs, and J.M. Magdalen, Total 43 pp.
Wikipedia, "Backus-Naur Form", [online], [Retrieved on Jan. 4, 2012]. Retrieved from the Internet at <URL: http://en.wikipedia.org/wiki/Backus%E2%80%93Naur_Form> Total 7 pp.
Notice of Allowance 1, Aug. 4, 2014, for U.S. Appl. No. 13/299,692, filed Nov. 18, 2011 by Y.S. Dayan et al., Total 17 pp.
Office Action 1, Apr. 15, 2014, for U.S. Appl. No. 13/299,692, filed Nov. 18, 2011 by Y.S. Dayan et al., Total 19 pp.
Response to Office Action 1, Jul. 15, 2014, for U.S. Appl. No. 13/299,692, filed Nov. 18, 2011 by Y.S. Dayan et al., Total 16 pp.
Notice of Allowance 2, Nov. 13, 2014, for U.S. Appl. No. 13/299,692, filed Nov. 18, 2011 by Y.S. Dayan et al., Total 11 pp.

* cited by examiner

SCALABLE RULE-BASED PROCESSING SYSTEM WITH TRIGGER RULES AND RULE EVALUATOR

FIELD OF THE INVENTION

The invention relates to computer-based rule processing systems and methods in general.

BACKGROUND OF THE INVENTION

Rule-based systems for processing documents typically employ trigger rules and actions, such that when a document meets the conditions of a trigger rule, such as where the document contains character sequences or patterns specified by the trigger rule, one or more actions associated with the trigger rule are performed. Unfortunately, as the number of trigger rules and the number of specified character sequences or patterns increases, the response time when evaluating rules will often increase due to poor scaling of existing rule-based systems.

SUMMARY OF THE INVENTION

A system, method and computer program product are provided for scalable, rule-based processing, including an automaton builder for constructing automatons corresponding to trigger rules and word lists that are employed by the trigger rules, and a rule evaluator for evaluating any of the trigger rules with respect to an input document by selecting any of the automatons to evaluate a given one of the trigger rules, parsing the input document using the selected automatons, determining whether conditions of the given trigger rule are met, and identifying any actions that are associated with the given trigger rule.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
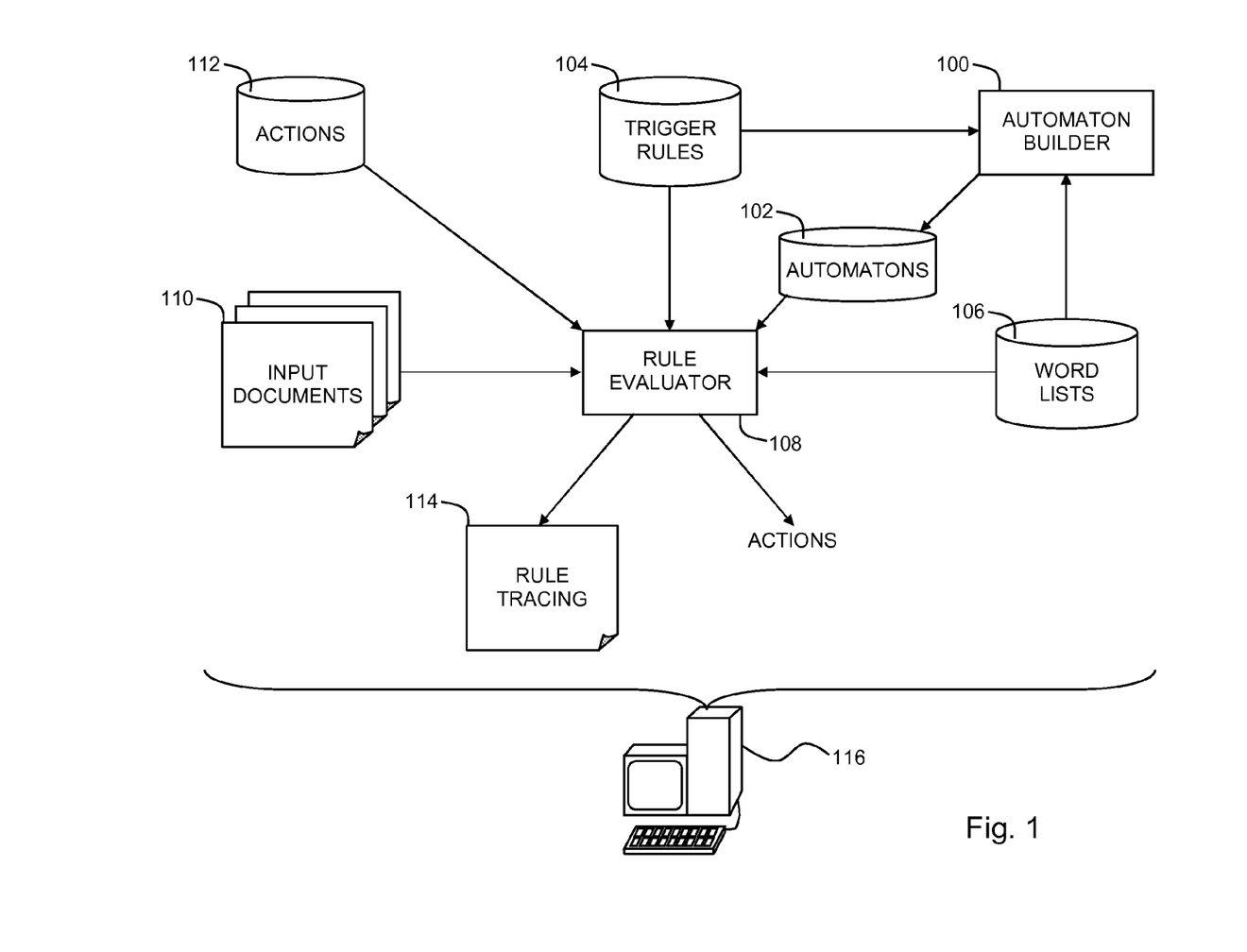
FIG. 1 is a simplified conceptual illustration of a system for scalable, rule-based processing, constructed and operative in accordance with embodiments of the invention.

Reference is now made to FIG. 1 which is a simplified conceptual illustration of a system for scalable, rule-based processing, constructed and operative in accordance with embodiments of the invention. In the system of FIG. 1, an automaton builder 100 is preferably configured to construct one or more automatons 102 by analyzing trigger rules 104 and any word lists 106 that may be employed by trigger rules 104, such as by using conventional static analysis techniques. A rule evaluator 108 is preferably configured to evaluate trigger rules 104 with respect to one or more input documents 110 by determining which of automatons 102 should be selected to evaluate a given trigger rule, and then by parsing the input documents 110 using the selected automatons 102, thereby determining whether the conditions of the trigger rule are met, and which actions 112 that are associated with the trigger rule should be performed. Rule evaluator 108 is also preferably configured to display in a rule tracing 114 any trigger rules 104 that are evaluated as described above, together with indicia for different portions of the displayed trigger rules 104 indicating whether evaluation of each portion was successful or unsuccessful, or whether evaluation of the portion was skipped. Various elements of FIG. 1 are now described in greater detail.

In the system of FIG. 1, input documents 110 may, for example, be electronic mail documents having a set of textual content fields, such as Body, Title, CC, etc., where a content field may be single-valued or multi-valued. Rule evaluator 108 may be configured to inspect all items of a multi-valued field as one unit, or single out a specific item. Each trigger rule 104 typically includes a trigger and one or more actions. Trigger rules 104 may be organized into groups of trigger rules, which groups serve as workflow control blocks. During evaluation of a group of trigger rules, a specific trigger rule may break out of the group, whereby the remaining trigger rules in the group are not evaluated. Groups of trigger rules may be evaluated iteratively, such as where the items of a multi-valued content field are processed in separate iterations. Below is an example of a trigger rule:

$Title contains 'Economics' and $Author contains ('Smith' or 'Jones')

When a given input document 110 is processed by the system of FIG. 1, it is preferably processed by rule evaluator 108 using those automatons 102 that were constructed using textual content fields that the given input document includes. For example, if a trigger rule 104 that included the textual content field 'Title' was used to construct a given automaton 102, and the given input document includes the textual content field 'Title', the given input document is preferably processed by rule evaluator 108 using the given automaton. The output of applied automatons 102 may be in the form of identifiers of textual content fields that were found, together with other information such as the locations within the input documents 110 where they were found. This output may be cached separately for each textual content field found. A combination of several textual content fields may be searched, where the fields are not concatenated together, but where the results of their searches are cached in a common data store.

Rule evaluator 108 preferably preprocesses an input document 110 with respect to an automaton 102 by beginning at position 0 in the input document text and proceeding to "feed" text characters to the automaton until all solutions are exhausted. This process is preferably repeated beginning from position 1, then 2, and so on until the end of the input document text is reached. Trigger rules 104 are then evaluated with respect to the results that were obtained during the preprocessing stage. Alternatively, the above preprocessing may be performed for a given textual content field when a given trigger rule that refers to the textual content field is selected.

Automaton builder 100 is preferably configured to construct separate automatons 102 for different types of searches, such as for the following types of searches:

1. Case-sensitive strings—searching for an exact substring in the original text
2. Case-insensitive strings—searching for a case-insensitive substring in the original text. During the static analysis described above the search term is preferably converted to lower case. At runtime a searched content field is converted to lower case once if this type of condition exists for it. The data is also preferably normalized for predefined variant spellings, such as where ü is converted to ue.
3. Case-sensitive words and phrases—searching tokenized text. During the static analysis described above the search term is preferably tokenized, multiple spaces are converted to a single space, and words are separated from punctuation marks by a space. Thus, the search term 'Mr. Smith' becomes a three-word phrase [Mr] [.] [Smith]. At runtime a searched content field is preferably tokenized once if this type of condition exists for it.
4. Case-insensitive words and phrases—both conversion to lower case and tokenization are preferably performed on the search term and on the input text. At runtime an input content field is preferably processed only if this type of search exists for the content field.
5. Text patterns using a predefined pattern grammar.

Separate automatons for other types of searches may be constructed, such as for searches for word roots or stems.

Rule evaluator 108 is preferably configured to support searches for substrings within a text, as well as searches for words and phrases, where the number and type of spaces between words does not matter. For word searches, rule evaluator 108 preferably enables searches for prefixes and suffixes using a wildcard character, such as '*'. Thus, for example, the search term 'Uni* *ation*' will find both 'Unix installation' and 'United Nations'. Rule evaluator 108 is also preferably configured to support searches where distance constraints between words may be specified, such as using the following syntax:

<w> d/<n> <w> (find 2 words that are <n> words apart or less—their order is unimportant)
<w> d/s <w> (find 2 words that are in the same sentence—their order is unimportant)
<w> s/<n> <w> (find 2 words that are <n> words apart or less—first word comes first)
<w> s/s <w> (find 2 words that are in the same sentence—first word comes first)

where the operand <w> represents a word or phrase, d/ is a distance operator, s/ is a sequence operator, /<n> represents <n> words or less, and /s refers to the same sentence.

'quotes' may be used to indicate a case-sensitive term, and in ~tilde~ to indicate a case-insensitive term. The operand <w> may also represent a combination of words (e.g., 'a' or ~b~ or . . . ) or the output of another distance operation. Several distance operations may be chained, for example:

'A' s/2 'B' s/3 ('C' or 'D') d/1 'E'

Rule evaluator 108 is preferably configured such that the distance operator operates on two sets of locations for the generation of a third set. For example:

(1)The (2)man (3)in (4)the (5)white (6)house (7).

In this example the location of 'house' is [position 6, position 6], where a location is a range of two positions, and the location of 'white house' is [position 5, position 6]. To perform the operation ~the~ s/1 ~white house~ rule evaluator 108 preferably merges two sets of input locations and generates one set of output locations, as follows:

{ [1,1], [4,4] } s/1 { [5,6] } → { [4,6] }

The first location is preferably discarded and the other locations are merged, generating a longer range.

Automaton builder 100 is preferably configured to construct separate automatons 102 for each of the word lists 106, updating a word list automaton 102 each time a related word list 106 is changed. Trigger rules 104 may refer to a word list 106 instead of referring to a specific word, or even to a combination of word lists 106, such as in the following example:

wordlist[A] or (wordlist[B] and wordlist[C])

This expression will trigger if a word from list A is found, or if a word from list B and a word from list C are found.

In the following example:

wordlist[FirstName] s/1 wordlist[LastName]

this expression will trigger whenever a word from the first list is followed immediately by a word from the second list.

As was described above, automaton builder 100 is preferably configured to construct a separate automaton 102 for searches that rely on text patterns using a predefined pattern grammar, such as a search for the pattern '[a-zA-Z] \d\d' which describes all words that start with an English letter followed by 2 digits. This may be implemented as follows:

1. During the static analysis described above, text patterns that appear in trigger rules 104 are identified and their ranges extracted. This may, for example, be represented as:

[a-zA-Z]-the standard English range
\d-the range [0-9]
a-a specific letter is considered to be a range of size 1

2. The ranges are converted into sets, such as:

[a-cz]→{ a,b,c,z}
\d→{ 0,1,2,3,4,5,6,7,8,9}
a→{ a}

3. The sets are analyzed to define non-overlapping sets, such as where the sets {a,b,c,d,e} are converted to {a,b,d, e} and {c}.

4. A unique set-ID is allocated to each of the new sets, such as:

{a, b, d, e}→1
{c}→2

5. The original patterns are preferably revised in accordance with the non-overlapping sets, such as where pattern '[a-e]c' is converted to ([abde] | c)c, where | denotes the union operation. Using the above set-IDs, the following pattern is obtained: (1|2)2

6. An automaton 102 is constructed for each pattern, where the set-IDs are used for transition from state to state. The automaton output may be expressed as a pattern-ID which uniquely identifies a pattern.

7. The individual pattern automatons 102 are preferably merged into a single master automaton 102, which is then converted into a deterministic, minimal state, finite state machine (FSM).

8. A two-stage table is preferably created that maps Unicode characters to their set-IDs. It will be appreciated that since the sets are non-overlapping, each Unicode character maps to just one set-ID (or to none).

Where a pattern includes the operator ^b, meaning "any character but 'b'", which could generate a very large set of characters, the resulting set may be included in the set of all Unicode characters in the calculation of intersected sets, resulting in a set containing all Unicode characters except those that are specifically excluded. Preferably, the two-stage table will point to this set by default, thus avoiding the need to create a large table in memory for mapping each of the 64K Unicode characters to a setID.

Rule evaluator 108 is preferably configured to process an input document 110 using a pattern-based automaton 102 constructed as described above by consulting the two-stage table for each input character to obtain a set-ID. If the set-ID is not found, the search stops. Otherwise, processing may continue using the set-ID as a transition value.

Figure 2:
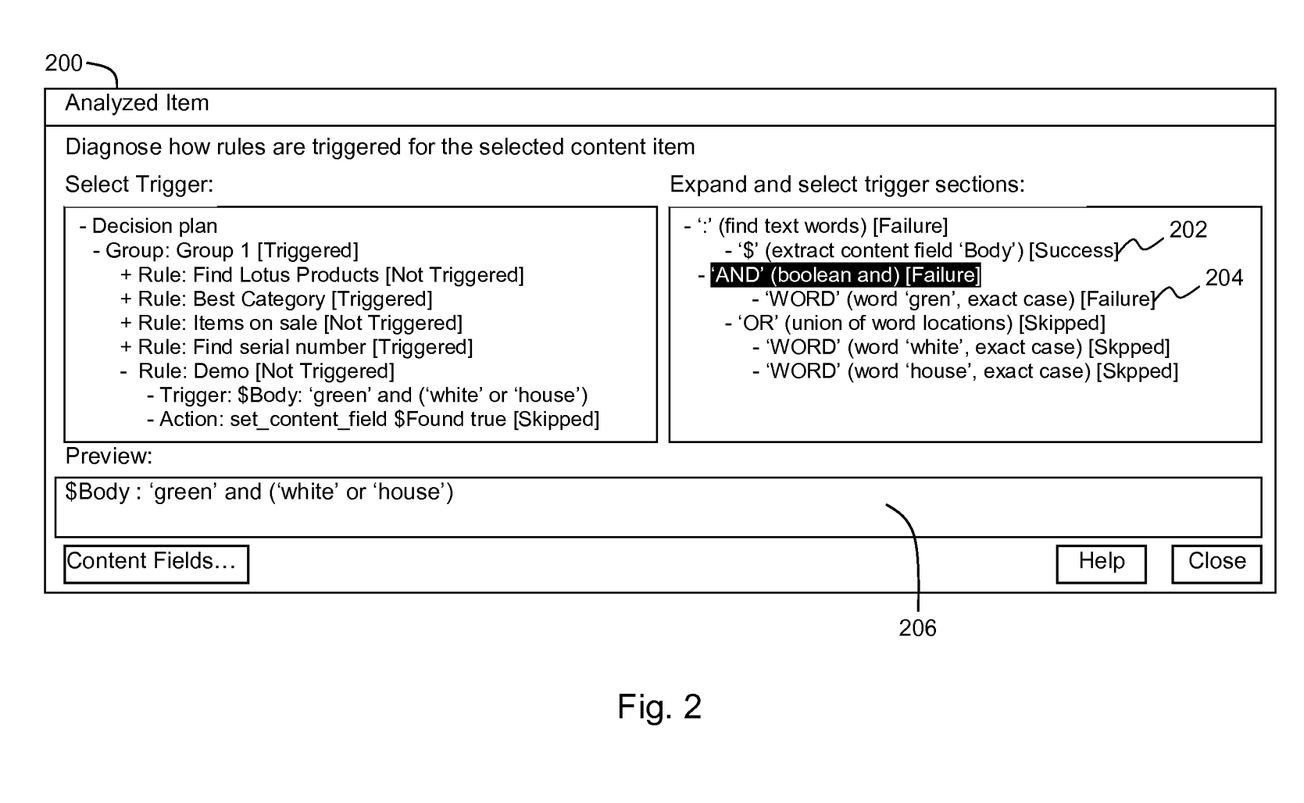
FIG. 2 is a simplified illustration of an exemplary rule tracing, constructed and operative in accordance with embodiments of the invention.

Rule tracing 114 preferably includes a flag for each group, rule, trigger and action, as well as a flag on each node of a trigger expression, to indicate results of the evaluation of trigger rules 104 by rule evaluator 108. The flags may, for example, indicate "true/success", "false/failure", and "skipped". A rule is skipped when a rule group is exited prematurely. A trigger node is skipped when lazy evaluation deems it unnecessary. An "error" flag may be used to distinguish between an operation returning "false" and an operation returning "error". The former may be flipped by a Boolean NOT operation to "true", while the latter remains an "error". FIG. 2 shows an exemplary rule tracing 200 in which the content field 'Body' at reference numeral 202 was found in the input document 110 being evaluated, whereas the word 'green' at reference numeral 204 could not be extracted. Therefore, due to lazy evaluation, the rest of the rule tree was not evaluated. A preview pane 206 shows a selected node's place in an original expression, as well as the sub tree that it controls.

It is appreciated that the expression language described above may also be applied to actions 112. Whereas a trigger expression evaluates to a Boolean value, an action expression may also evaluate to a string, number, or date. The expression language may thus be used to manipulate content fields and generate new ones.

Any of the elements shown in FIG. 1 are preferably implemented by one or more computers, such as a computer 116, by implementing the elements in computer hardware and/or in computer software embodied in a non-transient, computer-readable medium in accordance with conventional techniques.

Figure 3:
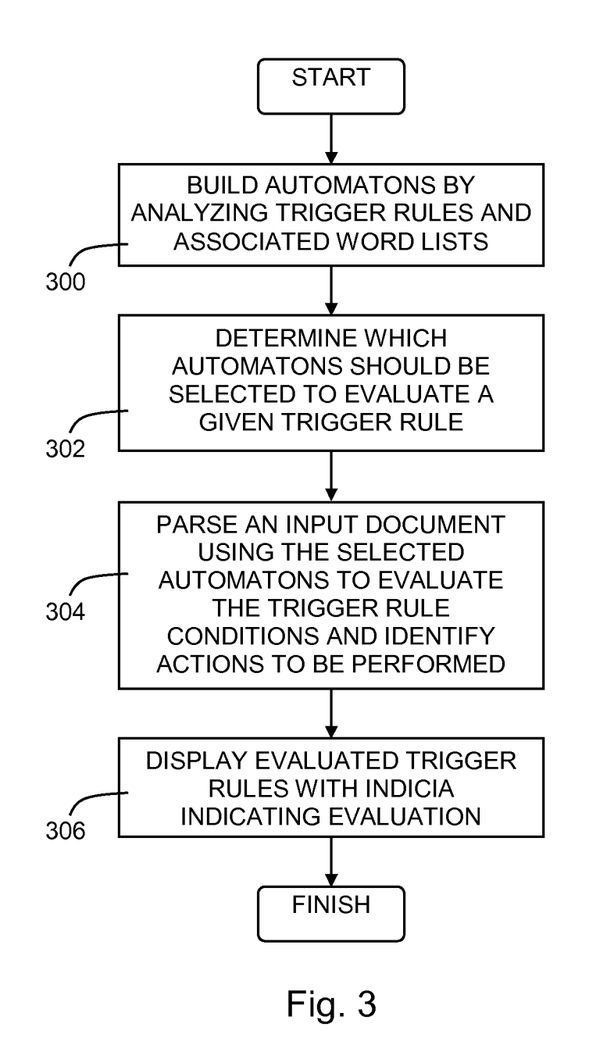
FIG. 3 is a simplified flowchart illustration of an exemplary method of operation of the system of FIG. 1, operative in accordance with embodiments of the invention.

Reference is now made to FIG. 3 which is a simplified flowchart illustration of an exemplary method of operation of the system of FIG. 1, operative in accordance with embodiments of the invention. In the method of FIG. 3, one or more automatons are constructed by analyzing trigger rules and any word lists that may be employed by the trigger rules (step 300). Trigger rules are evaluated with respect to one or more input documents by determining which automatons should be selected to evaluate a given trigger rule (step 302), and then by parsing the input documents using the selected automatons, thereby determining whether the conditions of the trigger rule are met, and which actions that are associated with the trigger rule should be performed (step 304). A rule tracing may be provided, displaying any trigger rules that are evaluated as described above, together with indicia for different portions of the displayed trigger rules indicating whether evaluation of each portion was successful or unsuccessful, or whether evaluation of the portion was skipped (step 306).

Figure 4:
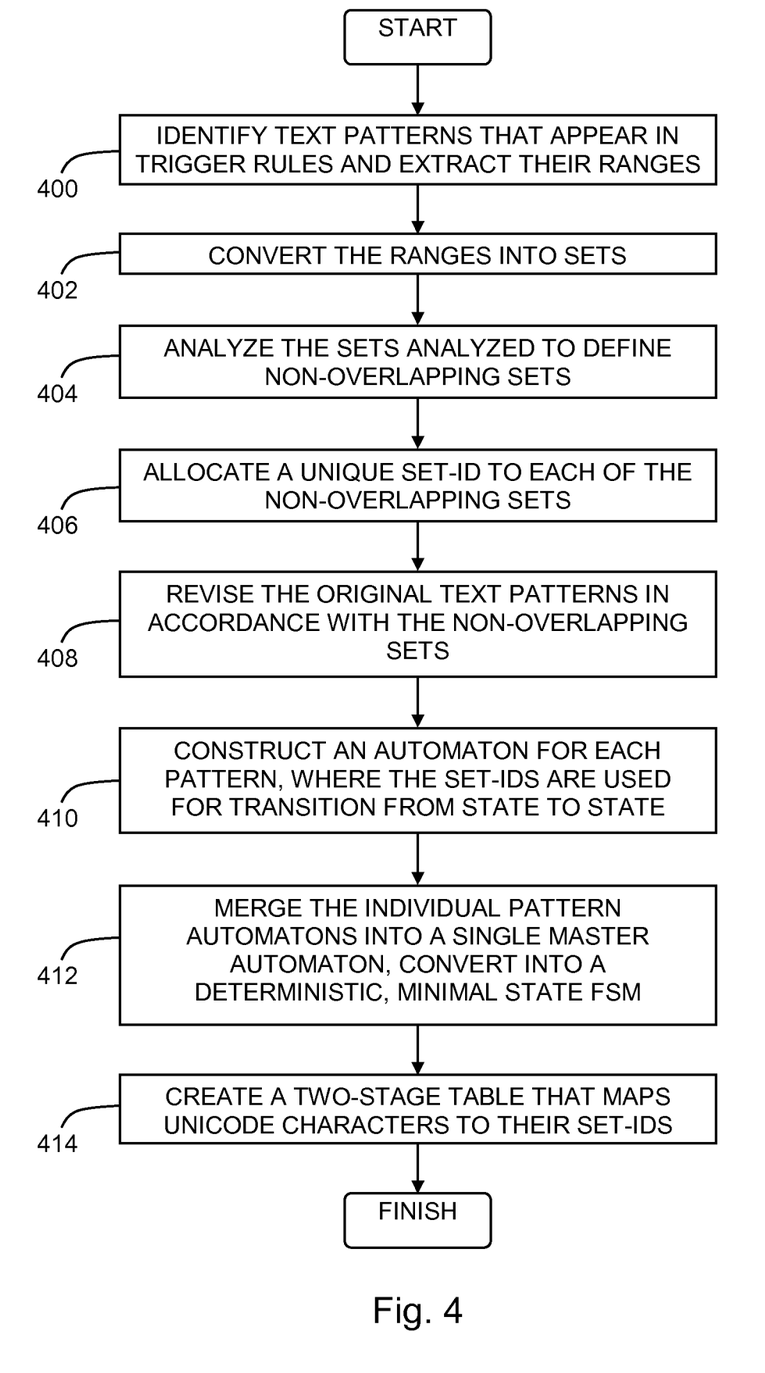
FIG. 4 is a simplified flowchart illustration of an exemplary method of constructing automatons for evaluating text patterns, operative in accordance with embodiments of the invention.

Reference is now made to FIG. 4 which is a simplified flowchart illustration of a method of constructing an automaton for evaluating text patterns using a predefined pattern grammar, operative in accordance with embodiments of the invention. In the method of FIG. 4, text patterns that appear in trigger rules are identified and their ranges extracted (step 400). The ranges are converted into sets (step 402), and the sets are analyzed to define non-overlapping sets (step 404). A unique set-ID is allocated to each of the non-overlapping sets (step 406). The original text patterns are revised in accordance with the non-overlapping sets (step 408). An automaton is constructed for each pattern, where the set-IDs are used for transition from state to state (step 410). The individual pattern automatons are merged into a single master automaton, which is then converted into a deterministic, minimal state FSM (step 412). A two-stage table is created that maps Unicode characters to their set-IDs (step 414).

Figure 5:
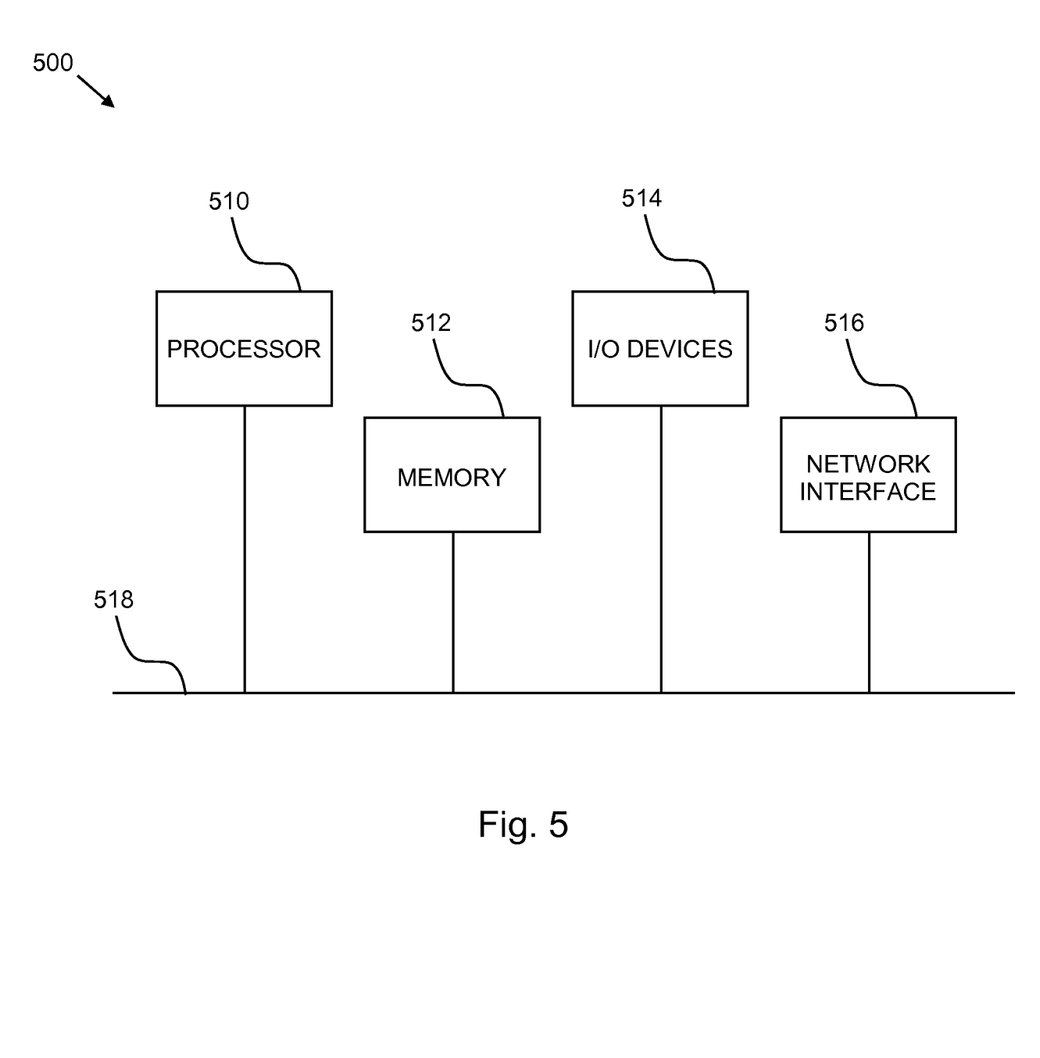
FIG. 5 is a simplified block diagram illustration of an exemplary hardware implementation of a computing system, constructed and operative in accordance with embodiments of the invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to embodiments of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods, computer program product and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for scalable, rule-based processing, the system comprising:
    a processor; and
    storage coupled to the processor, wherein the storage stores computer program instructions, and wherein the computer program instructions are executed by the processor to:
    construct a plurality of automatons corresponding to a plurality of trigger rules and a plurality of word lists that are employed by the trigger rules;
    evaluate any of the plurality of trigger rules with respect to an input document by:
        selecting any of the automatons to evaluate a given one of the plurality of trigger rules,
        parsing the input document using the selected automatons,
        determining whether conditions of the given trigger rule are met,
        identifying any actions that are associated with the given trigger rule, and display in a rule tracing any of the plurality of trigger rules that are evaluated, together with indicia for different portions of the displayed trigger rules indicating an evaluation result of each of the different portions.

2. The system of claim 1 where the input document includes a set of textual content fields, where each of the textual content fields are either single-valued or multi-valued.

3. The system of claim 1 where each of the trigger rules includes a trigger and at least one action.

4. The system of claim 1 where any of the trigger rules are organized into a group of trigger rules, where the group serves as a workflow control block.

5. The system of claim 4 where a trigger rule within the group is configured to prevent the evaluation of any other trigger rule within the group.

6. The system of claim 4 where the computer program instructions are executed by the processor to iteratively evaluate the trigger rules in the group.

7. The system of claim 1 where the input document is processed using any of the automatons that were constructed using textual content fields found in the input document.

8. The system of claim 1, wherein the computer program instructions are executed by the processor to:
provide output of the selected automatons in the form of identifiers of textual content fields found within the input document and locations of the textual content fields found within the input document.

9. The system of claim 1, wherein the computer program instructions are executed by the processor to:
identify text patterns that appear in the trigger rules and extract their ranges,
convert the ranges into sets
analyze the sets to define non-overlapping sets,
allocate a unique set-ID to each of the non-overlapping sets,
revise the text patterns in accordance with the non-overlapping sets,
construct an automaton for each pattern, where the set-IDs are used for transition from state to state,
merge the pattern automatons into a single master automaton,
convert the master automaton into a deterministic, minimal state FSM, and
create a two-stage table that maps Unicode characters to their set-IDs.

10. A computer program product for scalable, rule-based processing, the computer program product comprising:
a non-transitory computer-readable storage medium; and
computer-readable program code embodied in the computer-readable storage medium, where the computer-readable program code is configured to
construct a plurality of automatons corresponding to a plurality of trigger rules and a plurality of word lists that are employed by the trigger rules,
evaluate any of the plurality of trigger rules with respect to an input document by:
selecting any of the automatons to evaluate a given one of the plurality of trigger rules,
parsing the input document using the selected automatons,
determining whether conditions of the given trigger rule are met,
identifying any actions that are associated with the given trigger rule, and
display in a rule tracing any of the plurality of trigger rules that are evaluated, together with indicia for different portions of the displayed trigger rules indicating an evaluation result of each of the different portions.

11. The computer program product of claim 10 where the input document includes a set of textual content fields, where each of the textual content fields are either single-valued or multi-valued.

12. The computer program product of claim 10 where each of the trigger rules includes a trigger and at least one action.

13. The computer program product of claim 10 where the computer-readable program code is configured to
identify text patterns that appear in the trigger rules and extract their ranges,
convert the ranges into sets,
analyze the sets to define non-overlapping sets,
allocate a unique set-ID to each of the non-overlapping sets,
revise the text patterns in accordance with the non-overlapping sets,
construct an automaton for each pattern, where the set-IDs are used for transition from state to state,
merge the pattern automatons into a single master automaton,
convert the master automaton into a deterministic, minimal state FSM, and
create a two-stage table that maps Unicode characters to their set-IDs.

14. The computer program product of claim 10 where any of the trigger rules are organized into a group of trigger rules, where the group serves as a workflow control block.

15. The computer program product of claim 14 where a trigger rule within the group is configured to prevent the evaluation of any other trigger rule within the group.

16. The computer program product of claim 14 where the computer-readable program code is configured to iteratively evaluate the trigger rules in the group.

17. The computer program product of claim 10 where the input document is processed using any of the automatons that were constructed using textual content fields found in the input document.

18. The computer program product of claim 10 where the computer-readable program code is configured to provide output of the selected automatons in the form of identifiers of textual content fields found within the input document and locations of the textual content fields found within the input document.

* * * * *